United States Patent
Phadke

(10) Patent No.: US 6,493,245 B1
(45) Date of Patent: Dec. 10, 2002

(54) INRUSH CURRENT CONTROL FOR AC TO DC CONVERTERS

(75) Inventor: Vijay Gangadhar Phadke, Pasig (PH)

(73) Assignee: Astec International Limited (HK)

( * ) Notice: Subject to any disclaimer, the term of this patent is extended or adjusted under 35 U.S.C. 154(b) by 0 days.

(21) Appl. No.: 09/930,818

(22) Filed: Aug. 15, 2001

(51) Int. Cl.⁷ .............................................. H02H 7/125
(52) U.S. Cl. ........................... 363/54; 363/88; 323/908
(58) Field of Search ........................... 323/908; 363/53, 363/54, 84, 88

(56) References Cited

U.S. PATENT DOCUMENTS

| | | | | |
|---|---|---|---|---|
| 4,161,022 A | * | 7/1979 | Kanazawa et al. | 363/88 |
| 4,218,728 A | * | 8/1980 | Chambers et al. | 363/87 |
| 4,233,558 A | * | 11/1980 | Gaertner | 363/88 |
| 4,315,305 A | * | 2/1982 | Siemon | 363/88 |
| 4,376,968 A | * | 3/1983 | Wueschinski et al. | 363/88 |
| 4,620,296 A | * | 10/1986 | Siemon | 363/51 |
| 4,729,082 A | * | 3/1988 | Sato | 363/88 |
| 4,811,189 A | * | 3/1989 | Harvest et al. | 363/88 |
| 4,864,482 A | | 9/1989 | Quazi et al. | 363/37 |
| 5,202,819 A | | 4/1993 | Min | 363/86 |
| 5,420,780 A | | 5/1995 | Bernstein et al. | 363/89 |
| 5,715,154 A | | 2/1998 | Rault | 363/89 |
| 5,822,203 A | * | 10/1998 | Peron | 323/908 |
| 5,995,395 A | * | 11/1999 | Rivet | 363/88 |
| 6,163,712 A | | 12/2000 | Winkler et al. | 323/908 |
| 6,222,749 B1 | * | 4/2001 | Peron | 323/908 |

* cited by examiner

*Primary Examiner*—Jeffrey Sterrett
(74) *Attorney, Agent, or Firm*—Coudert Brothers LLP

(57) ABSTRACT

The present invention provides for an apparatus and corresponding method for controlling inrush current in an AC-DC power converter by controlling the state of a plurality of silicon-controlled rectifiers (SCRs) when AC power is lost. The present invention provides full control of inrush current even during cold startup, warm startup, and power line disturbance conditions. The present invention controls inrush current without the need for an extra series dissapative device and its consequent additional losses. The preferred embodiment includes use of the present invention for AC-DC converters having active power factor correction. An alternative embodiment is for use in non-power factor corrected applications.

2 Claims, 5 Drawing Sheets

INRUSH CURRENT CONTROL FOR AC TO DC CONVERTERS

FIELD OF INVENTION

The present invention relates to controlling inrush current in a power supply, and more particularly, to circuitry for controlling inrush current efficiently during cold startup, warm startup and power line disturbance conditions.

BACKGROUND OF THE INVENTION

The control of inrush current is especially important in N+1 redundant power systems. If excessive inrush current blows a fuse or trips the main circuit breaker on an AC distribution board, then the redundancy of the entire system is lost, even if the power supply is still functioning properly. The inrush current requirements of modem power supplies are very stringent, demanding efficient control of inrush current even during abnormal power line disturbances and for high current applications.

To control inrush current, conventional methods may employ a relay, thermistor, thyristor or similar switch, often in combination with a resistor or thermistor, in an attempt to limit inrush current in an AC-DC power supply. As is known in the art, a thermistor is a component with a resistance that decreases as its temperature increases. During power supply startup, the temperature of the thermistor is cold and its resistance high, a characteristic that can be used to limit inrush current. As the power supply continues to operate, the temperature increases and the resistance of the thermistor decreases, thereby allowing more current during normal operation.

FIG. 1 illustrates a prior art method and circuit disclosed in U.S. Pat. No. 5,202,819 to Min that includes a thermistor for controlling inrush current. Although the disclosed method provides inrush current control, it has major drawbacks. One drawback is that a Thermistor TH1 in smoothing circuit 3 is always present as a series element, resulting in power dissipation proportional to the input current. This method is therefore inefficient especially for high current applications. In addition, if a power line disturbance (PLD) occurs during operation, the hot thermistor will be functioning at low resistance and so will not limit inrush current effectively. Thus, to prevent inrush current caused by the PLD, some delay must be built in to first allow the thermistor to cool or a circuit provided that bypasses the thermistor, in order to control inrush current.

Another drawback of the prior art circuit shown in FIG. 1 is that it uses a "Near Zero Crossing" detection for triggering two silicon controlled rectifiers (SCRs) in the phase control rectifying circuit 5. An SCR is a device which is normally non-conducting, with conduction initiated by application of a gate current. The SCR will remain ON (i.e., conducting) until current flowing in the SCR is reduced to some minimum level. If AC power fails at a non zero phase angle, slightly higher than sensed for "Near Zero Crossing", and recovers at the same angle after a period of one cycle, the control circuit 4 in FIG. 1 will wait for the next near zero crossing, after nearly another half AC cycle, before triggering the SCRs. A larger bulk capacitor C2 will be required to provide energy during such a power line disturbance, even when AC is restored. The result is a circuit that costs more and that has increased space requirements.

FIG. 1A shows a timing diagram that illustrates this drawback of the prior art circuit of FIG. 1. The SCR drive signal waveform shows the SCR gate drive pulses that occur at near zero phase angle. When AC fails at a non-zero phase angle, as shown in the Rectified Pulses waveform at point A, the SCR gate drive signal will stay ON as long as energy is available on C2. If C2 has too much energy, however, there is a possibility that, due to circuit delays, the SCRs will trigger when AC restores at point B. This would result in heavy inrush current. If the charge on C2 decays, then the SCR's gate drive is unavailable at point B for nearly one half cycle, upon restoration of AC power, until another zero crossing occurs at point C. As mentioned above, this problem forces use of a bigger bulk capacitor to maintain charge during the hold up period.

Another prior art method of inrush current control is disclosed in U.S. Pat. No. 5,715,154 to Rault, and shown in FIG. 2. This method has a drawback of including an extra series switch, Thyristor, TH. This extra switch will dissipate additional power; the dissipation being proportional to the input current. Thus, this method has the drawback of being very inefficient, especially for higher power applications, resulting in higher cost and the need for space-consuming heat sinking due to the increased dissipation.

FIG. 3 illustrates another conventional circuit for inrush current control. The circuit of FIG. 3 provides some inrush current control but has the drawback of not providing control during power line disturbance conditions. Modem power supply applications demand controlled inrush current even during power line disturbances that result in lost AC power. At power start up, both SCR1 and SCR2 in the bridge rectifier shown in FIG. 3 are in the OFF state due to a lack of gate drive voltage. The initial inrush current flows through elements D1, D2, R1, and D5 into a bulk capacitor Co at the output of the circuit. The amount of inrush current can be kept below a desired value by choosing an appropriate value for limiting resistor R1. In operation, the Power Factor Control (PFC) boost regulator PFC1 then starts operating by drawing power through D1, D2, and R1. Bias voltage is induced in the secondary winding on the boost choke L due to the switching action of the boost switch Q1. This induced bias voltage drives the SCRs. At that point, all power is delivered through the diode-SCR bridge.

Although the circuit of FIG. 3 can control inrush current satisfactorily for hot or cold start up conditions, the circuit has the drawback of not providing the inrush current control demanded by current generation power supplies when power line disturbances occur. Assuming an operating condition when a DC-DC converter (not shown) coupled to the output is already active and drawing power from the PFC boost regulator PFC1 at a low line voltage, e.g., 90V AC. If a power line disturbance occurs causing a missing AC cycle, bulk capacitor Co at the output can continue to deliver power to the DC-DC converter during this "hold up" period. If capacitor C1 is small and cannot hold sufficient charge for driving the SCRs during this hold up period, and if AC is restored in a time interval slightly less than the hold up time; then PFC 1 will start switching immediately through D1, D2, and RI with most of the voltage dropped in R1. This will require a longer time to generate the required gate drive for the SCRs, which results in depletion of the charge on Co. Alternatively, if C1 is made sufficiently large, the depletion problem can be solved, as the SCRs will remain ON and can then support the required power levels of the DC-DC converter. The circuit of FIG. 3 does, however, have the drawback of not controlling inrush current at high line voltage during a power line disturbance condition. If an AC cycle is missed in a high line voltage condition, Co will deliver the hold up power and the voltage across it will drop accordingly. In this case, the SCRs are kept ON due to the charge available on C1. Under this condition, restoration of AC at the 90-degree phase angle and peak of 264V AC results in an undesirably huge inrush current. Thus, under power line disturbance conditions, the conventional method and circuit in FIG. 3 does not control inrush current satisfactorily.

What is needed is a reliable and efficient circuit and corresponding method for controlling inrush current in high-power electronic power supplies during hot and cold startup conditions and during power line disturbances.

SUMMARY OF THE INVENTION

The present invention solves the problems of prior art devices by providing a circuit and corresponding method which provides control to limit inrush current during cold startup, hot startup and power line disturbance conditions in AC to DC converters. The circuit of the present invention can be used for AC to DC converters with active power factor correction circuitry. The circuit includes a logic circuit that operates such that whenever AC is lost, SCR gates are turned OFF and are allowed to turn ON only when AC is restored and the instantaneous AC voltage is less than the bulk voltage at the time, thus eliminating the possibility of undesirable heavy inrush current. The circuit can also be used for non-power factor corrected applications if an auxiliary high side drive bias is available for the SCRs used in the bridge rectifier.

Broadly stated, the present invention provides a method of controlling inrush current in a AC-DC converter when AC power is lost during power line disturbance conditions comprising the steps of maintaining a plurality of SCRs in an OFF state to limit inrush current when the AC power is lost; comparing the instantaneous AC input voltage to the DC output voltage of the converter; comparing the instantaneous AC input voltage to a predetermined voltage level; and triggering the plurality of SCRs to the ON state only when the AC power is restored to the predetermined level and the instantaneous input AC voltage is less than the DC voltage at the output of the AC-DC converter. In addition, broadly stated, the present invention provides a circuit for providing control of inrush current in an AC to DC power converter during power disturbance conditions, wherein the AC to DC converter includes two input terminals to which AC power is coupled and two output terminals where the output DC power is provided, comprising a bridge rectifying circuit including a plurality of SCRs; a circuit to provide a drive bias for the plurality of SCRs; an output capacitor connected across the output terminals of the converter; a control circuit for controlling the rectifying circuit to limit inrush current, the control circuit being operatively connected to the gate inputs of the plurality of SCRs; and means for comparing the AC input and DC output voltages of the converter for causing the plurality of SCRs to enter a conduction state when the AC input voltage exceeds a predetermined threshold and the AC input voltage is less than the DC output voltage.

Consequently, the circuit and corresponding method of the present invention have the advantage that inrush current is controlled both for hot startup and cold startup conditions.

Another advantage of the present invention is full control of inrush current even during power line disturbance conditions.

Still another advantage of the present invention is that there is no need for an extra series dissipative device, and its consequent additional losses.

BRIEF DESCRIPTION OF THE DRAWINGS

The forgoing aspects and the attendant advantages of the present invention will become more readily appreciated by reference to the following detailed description, when taken in conjunction with the accompanying drawings, wherein.

DETAILED DESCRIPTION OF THE INVENTION

The present invention comprises a circuit and corresponding method which provides control to limit inrush current during cold startup, hot startup and power line disturbance conditions in AC to DC power converters.

Figure 4A:
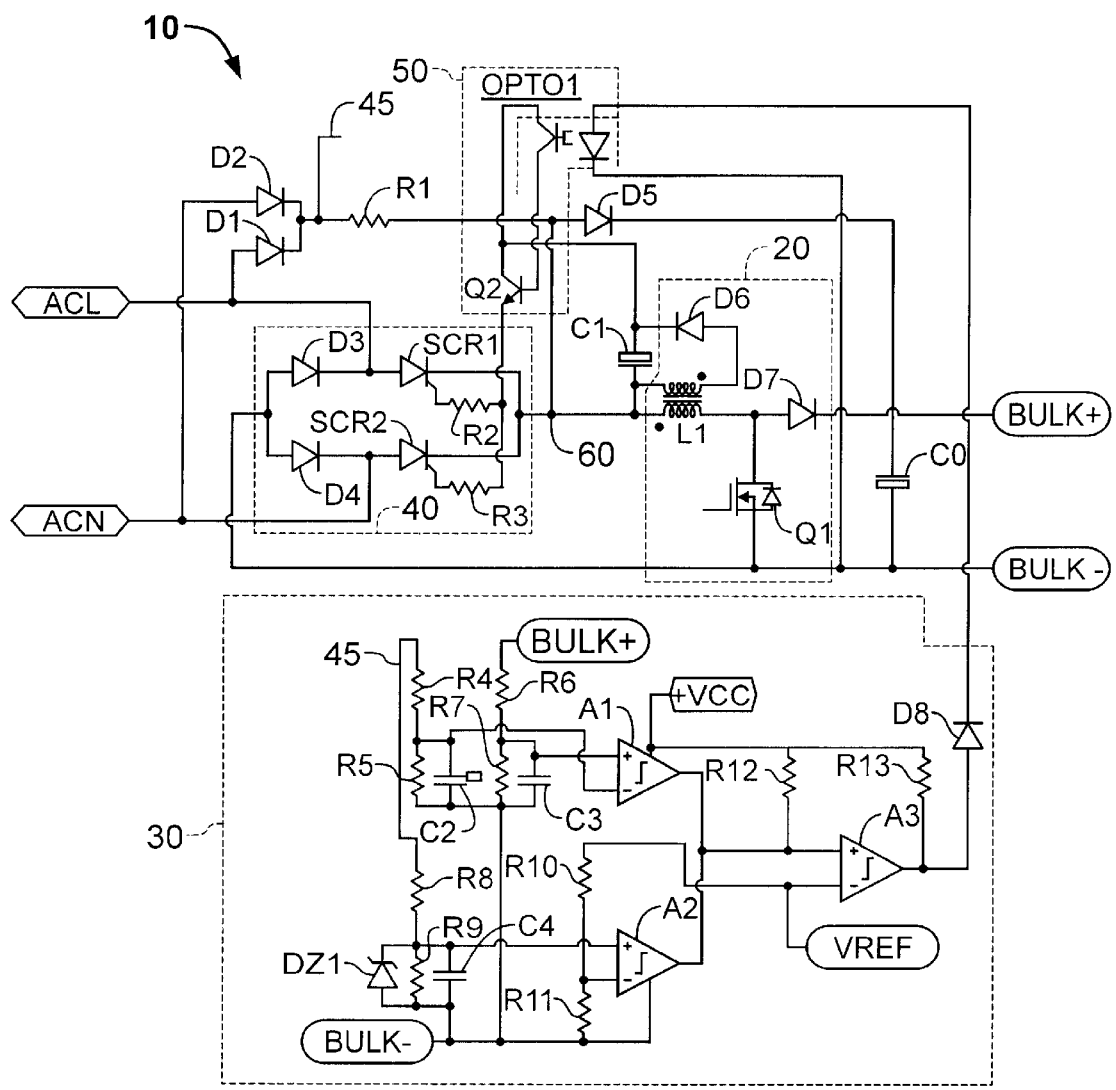
FIG. 4A shows the circuit for the preferred embodiment of the present invention.

FIG. 4A shows a circuit diagram of the preferred embodiment of an AC-DC power converter 10 according to the present invention. The inrush control logic circuit for power converter 10 is identified at 30.

In FIG. 4A, circuit 10 comprises a bridge rectifier 40, a power factor correction boost converter 20, a level shifting circuit 50, and the inrush control logic circuit 30. As shown, circuit 10 is operatively connected between an input AC voltage (shown appearing across terminals ACL and ACN) from an AC voltage source (not shown) and an output "bulk" DC voltage appearing across terminals Bulk+ and Bulk–. The DC output bulk voltage is typically applied to the inputs of a DC-DC converter (not shown) to provide further regulation and/or voltage conversion. A pair of rectifiers D1 and D2 are connected between the AC inputs and a limiting resistor R1 and apply rectified AC pulses to R1, as shown at node 45. Diode D5 is connected in series between R1 and the positive DC Bulk voltage node terminal. Capacitor Co is connected across the DC output bulk voltage terminals.

A bridge rectifier 40 comprises diodes D3 and D4, two SCRs, SCR1 and SCR2, and two resistors R2 and R3 that are connected to respective gate terminals of the SCRs. The operation of bridge rectifier 40 and SCR1 and SCR2 is well known in the art. The bridge rectifier output is connected at node 60 and is in parallel with R1. Node 60 is coupled to diode D5 and to the power factor correction (PFC) circuit 20. A boost converter topology is preferably used for circuit 20. The PFC boost converter 20 is operatively connected between node 60 and capacitor Co, and preferably includes a choke inductor L1, switch Q1, two diodes D6 and D7. Switch Q1 is coupled in parallel with a series combination of diode D7 and capacitor Co. Capacitor C1 is connected across L1 and D6 of the PFC boost converter 20. C1 is also connected between node 60 and the collector of transistor Q2 in the level shifting circuit 50. The level shifting circuit 50 also includes an opto-coupler OPTO1. OPTO1 is an opto-coupler package used to transmit the gate drive control signal from between the electrically isolated inrush control logic 30 and the SCRs. Transistor Q2 is a driver transistor coupled to OPTO1 which increases the current driving capacity of the signal from OPTO1 in order to control triggering of the SCRs.

The inrush control circuit 30 includes three comparators A1, A2, and A3 and corresponding control logic. The AC voltage signal at node 45 is divided by a voltage divider formed by series resistors R4 and R5 to generate a sample of instantaneous AC voltage which is applied to the negative input of comparator A1. As is known in the art, the high AC voltage level and the corresponding bulk DC voltage levels must be scaled down accordingly to provide signal levels suitable for comparison by standard comparator components. Similarly for comparator A2, the AC signal at node 45 is divided by a voltage divider formed by series resistors R8 and R9 to generate a sample of instantaneous AC voltage which is applied to the positive input of A2. The DC Bulk voltage is divided by a voltage divider formed by series resistors R6 and R7 to generate a representation of the bulk voltage which is applied to the positive input of comparator A1. A reference voltage Vref is connected to the negative input of comparator A3. Vref is also divided by a voltage divider formed by series resistors R10 and R11 and applied to the positive input of comparator A2 in order to define a threshold to set the Near Zero crossing detection for comparator A2. A suitable Vref level is chosen depending on the desired threshold. Inrush control logic 30 also includes capacitors C2, C3, and C4 for filtering and decoupling of noise, and a Zener diode DZ1 connected across R9 that protects comparator A2, as is well known in the art. The outputs of comparator A1 and A2 are connected to generate the positive input signal for comparator A3. Diode D8 couples the comparator A3 output to the level shifting circuit 50.

The operation of the invention as shown in FIG. 4A will now be described in more detail. In general, circuit 10 of the present invention uses a value of C1 large enough to keep both SCRs, SCR1 and SCR2, ON during the hold up time, but the inrush control circuit 30 is used to control turn ON of the SCRs. Whenever AC power is lost, during hot or cold startup or due to a power line disturbance, both SCR gates are turned OFF and are allowed to turn ON only when AC is restored and the instantaneous AC voltage is less than the bulk DC voltage at that instant. This operation overcomes the drawbacks of known inrush current control methods, by eliminating the possibility of heavy inrush current for hot startup, cold startup and power line disturbance conditions. If AC restores at a peak of 264V, limiting resistor R1 takes care of the inrush current.

The detailed operation of the circuit 10 is described as follows. At power ON, initial inrush current passes through D1, D2, R1 and D5. An auxiliary supply (not shown) then begins operating to provide bias voltage to PFC boost converter 20. Switch Q1 of the PFC boost converter 20 starts switching with the DC-DC converter (not shown) still OFF. Typically the DC-DC converter is designed to start its operation when bulk DC voltage exceeds 390V. The PFC boost converter 20 is used in the AC-DC converter for both harmonic current correction and power factor correction. The signal for driving Switch Q1 is obtained from a control circuit (not shown) which varies the pulse width of a control signal that is inversely proportional to the instantaneous AC voltage. In operation, the drive pulse is wider near the bottom of the AC pulse and gradually narrower as the sinusoidal voltage increases toward its peak. This operation results in input current that is sinusoidal with a high power factor and low harmonic distortion. The drive signal provides suitable high frequency switching of Q1, e.g. in the range of between 20 kHz and several hundred kHz. As is well known in the art, high frequency switching of the PFC boost converter 20 enables reduced component size.

When Q1 of the PFC boost converter 20 is turned ON, energy is stored in inductor L1. When Q1 turns OFF, this energy is released in the output capacitor Co through D7. This switching action of Q1 develops an SCR bias voltage across capacitor C1. For continuous mode PFC operation, this bias voltage on C1 is fairly well regulated as the PFC boost converter 20 operates in flyback mode.

The control logic of the present invention for control of the SCRs to limit inrush current during hot startup, cold startup, and power line disturbance condition is now described. For the inrush control logic 30 to generate a gate control signal for triggering the SCRs, both comparators A1 and A2 must be in a high state. As seen in FIG. 4A, comparator A1 has as inputs a sample of instantaneous AC voltage and a representation of the value of the bulk DC voltage. The operation of comparator A1 ensures that the instantaneous AC voltage is less than the Bulk DC voltage on the sinusoidal rising voltage. The absence of AC voltage, however, would result in an instantaneous AC voltage which is less than the Bulk DC voltage for comparator A1. Comparator A2 is thus included to ensure that AC voltage is present. Comparator A2 compares a reference voltage, Vref, to the AC voltage at node 45. Comparator A2 is set in a high state to allow triggering of the SCRs only when AC voltage crosses a threshold of preferably about 15V. This threshold does not affect the power factor correction since the PFC boost converter 20 starts boosting action from approximately 35V.

The operation of comparator A2 to ensure AC is present is important since if only comparator A1 was used, SCRs would remain ON in the case of a missing AC cycle which would result in huge inrush current upon restoration of AC to its peak value. This condition is to be avoided since it could be uncontrollable, as commutation of SCRs will be very difficult. In operation, if input AC restores at some non-zero phase angle, and at that instant, if peak voltage is higher than bulk voltage, then the SCRs are held OFF. The SCRs remain held off until the instantaneous AC voltage falls below the bulk DC voltage while traversing the sinusoidal path. Only then are the SCRs allowed to trigger. This operation is illustrated by the waveforms in FIG. 4B which is described in detail below. This operation of the circuit of the present invention overcomes the drawbacks of the known methods which fail to limit inrush current reliably and efficiently in the case of power line disturbances.

Comparator A3 is set to a high state only when the outputs of comparators A1 and A2 are both set to a high state. This operation ensures both that AC is present and that instantaneous AC voltage is less than the bulk DC voltage. Diode D8 couples the output of comparator A3 to the level shifting circuit 50. The level shifting circuit 50 is required since the inrush control logic 30 generates a low side control signal that must be level shifted to a high drive signal in order to drive the gate of the SCRs to control triggering. OPTO1 is an opto-coupler package which is necessary for transmitting the signal between the electrically isolated inrush control logic 30 and SCR circuits. Transistor Q2 is a driver transistor coupled to OPTO1 which increases the current driving capacity of the signal from OPTO1 in order to control triggering of the SCRs.

Figure 1A:
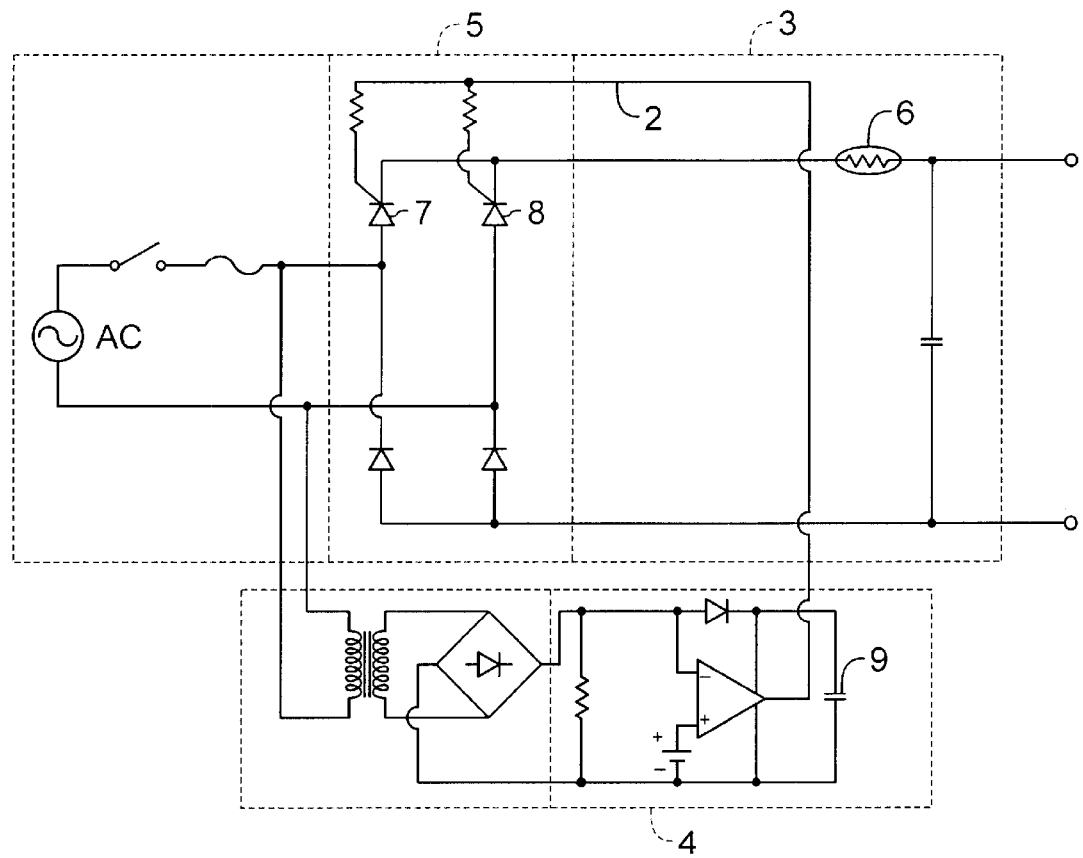
FIG. 1A shows a prior art circuit that includes a thermistor for controlling inrush current.
Figure 1B:
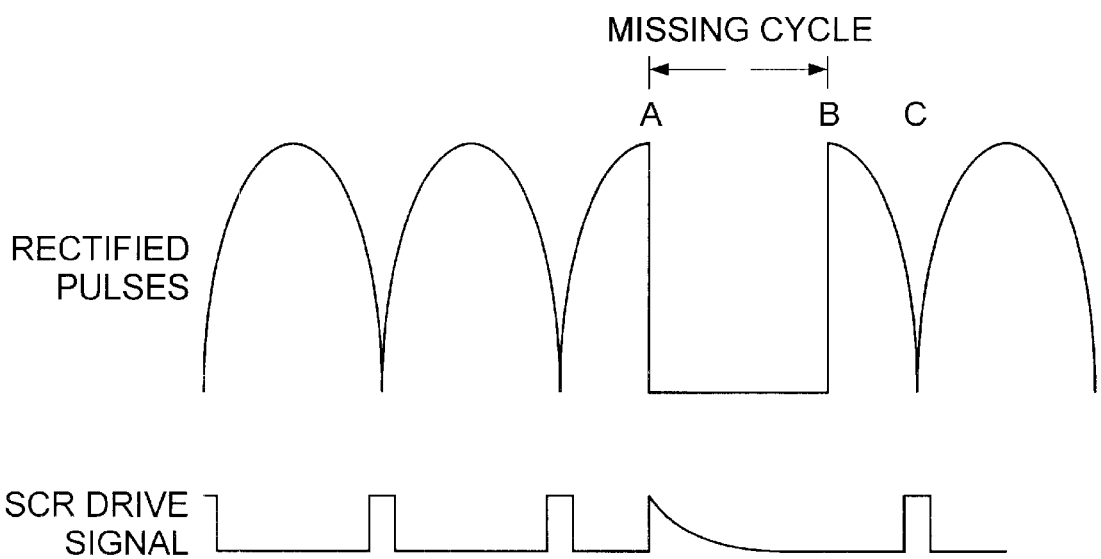
FIG. 1B shows a timing diagram illustrating a drawback of prior art circuit of FIG.1.
Figure 2:
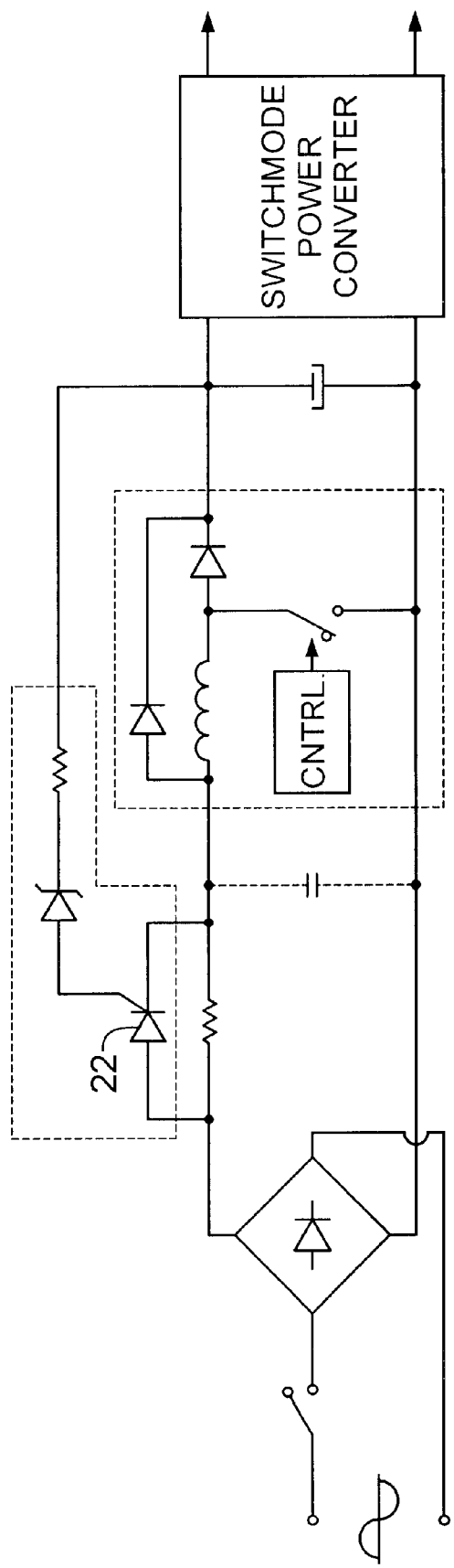
FIG. 2 depicts another prior art method of inrush current control that includes an extra series dissipative switch.
Figure 3:
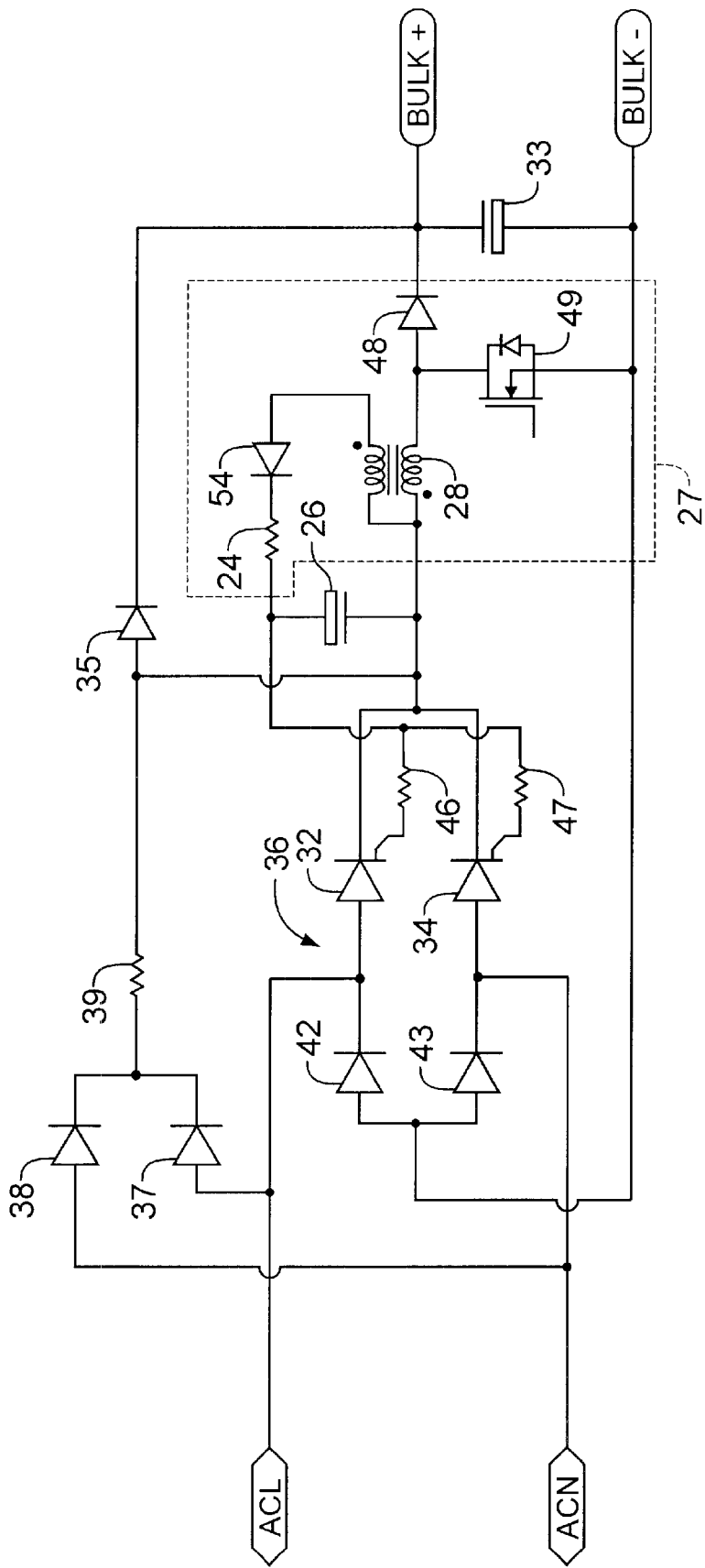
FIG. 3 illustrates another prior art circuit that provides some control of inrush current at startup but not during power line disturbances.
Figure 4B:
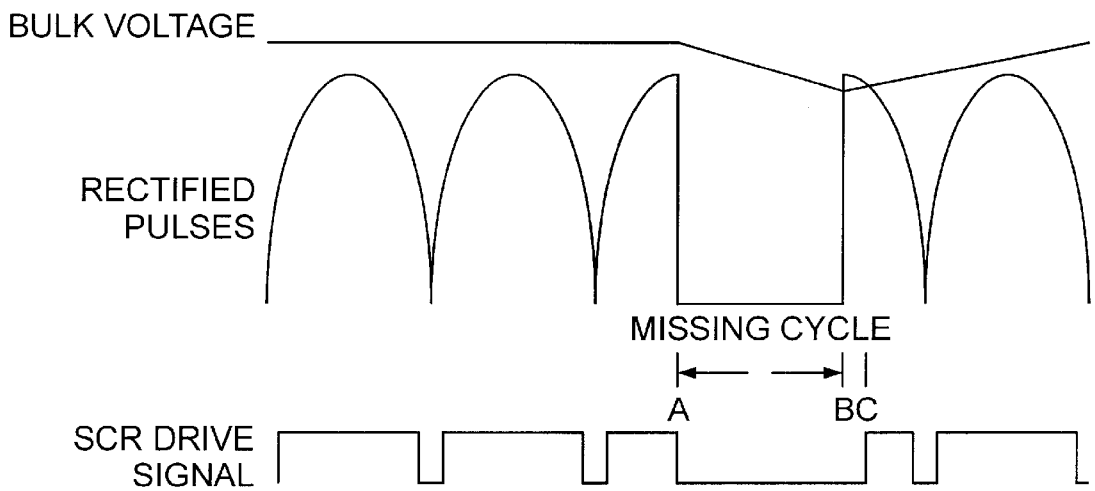
FIG. 4B is a timing diagram illustrating the SCR gate drive signal timing during a missed AC cycle for the circuit in FIG. 4A.

FIG. 4B is a timing diagram illustrating the circuit operation for SCR gate drive signal timing during a missed AC cycle for the invention. A gate drive pulse is applied to the SCRs only when instantaneous AC voltage is non zero and lower than the bulk DC voltage. When AC voltage fails at a non-zero phase angle the SCR gate drive signal will be kept low. Bulk voltage will continue to decay as shown in the top waveform, while supplying energy to the DC-DC converter during the hold up period. When AC voltage restores at a non zero phase angle, the SCR drive signal is held low until the instantaneous AC voltage falls below the bulk DC voltage as shown, which prevents the huge inrush current that would result from other known methods. By contrast, for the FIG. 1 prior art method, as seen from FIG. 1A, a bulk capacitor must provide hold up power until the next zero crossing point even after AC is restored.

Figure 5:
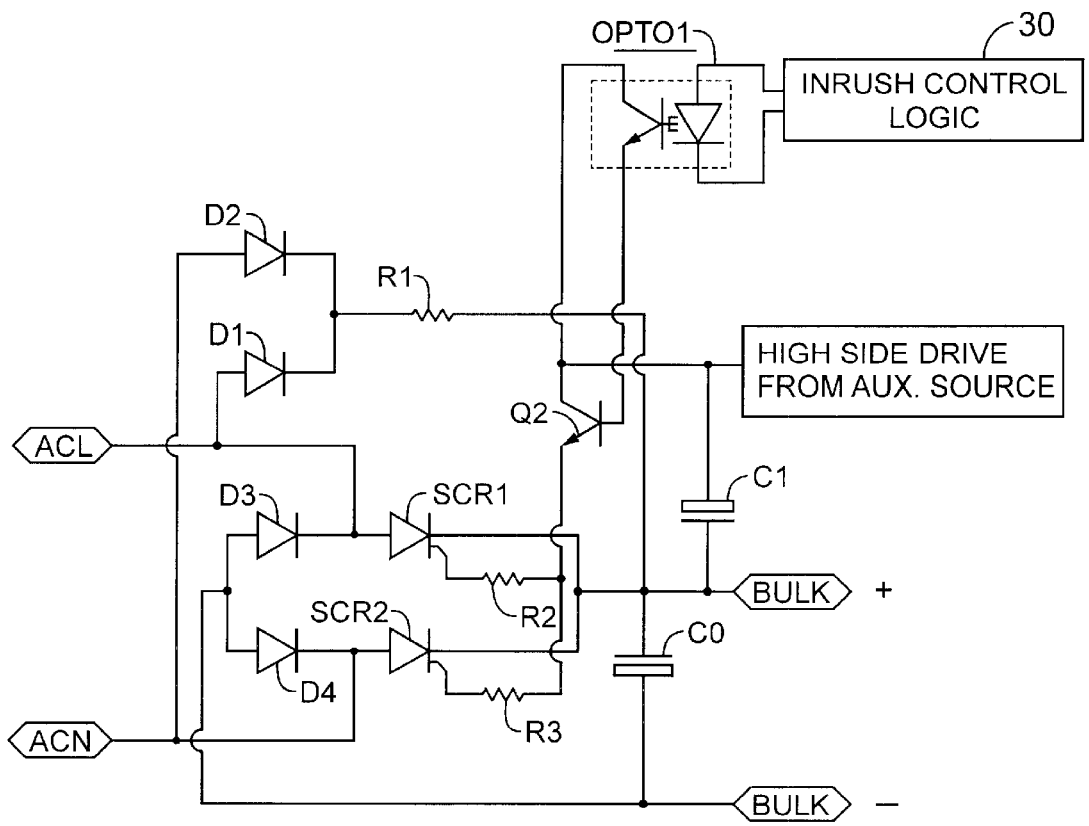
FIG. 5 shows an alternative embodiment of the invention for use in non-power factor corrected applications.

FIG. 5 shows an alternative embodiment of the invention using a different bias for use in non-power factor corrected applications. An auxiliary high side drive bias is provided, as shown, for the SCRs used in the bridge rectifier.

The foregoing detailed description of the invention has been provided for the purposes of illustration and description. Although exemplary embodiments of the present invention have been described in detail herein with reference to the accompanying drawings, it is to be understood that the invention is not limited to the precise embodiments disclosed, and that various changes and modifications to the present invention are possible in light of the above teaching.

What is claimed is:

1. A method of controlling inrush current in a AC-DC converter when AC power is lost during power line disturbance conditions comprising the steps of:

a) Maintaining a plurality of SCRs in an OFF state to limit inrush current when said AC power is lost;

b) Comparing the instantaneous AC input voltage to the DC output voltage of the converter;

c) Comparing the instantaneous AC input voltage to a predetermined voltage level; and d) Triggering said plurality of SCRs to the ON state only when said AC power is restored to said predetermined level and the instantaneous input AC voltage is less than the DC voltage at the output of the AC-DC converter.

2. A circuit for providing control of inrush current in an AC to DC power converter during power disturbance conditions, wherein the AC to DC converter includes two input terminals to which AC power is coupled and two output terminals where the output DC power is provided, comprising:

a bridge rectifying circuit including a plurality of SCRs;

a circuit to provide a drive bias for said plurality of SCRs;

an output capacitor connected across said output terminals of the converter;

a control circuit for controlling the rectifying circuit to limit inrush current, the control circuit being operatively connected to the gate inputs of said plurality of SCRs; and means for comparing the AC input and DC output voltages of the converter for causing said plurality of SCRs to enter a conduction state when said AC input voltage exceeds a predetermined threshold and said AC input voltage is less than the DC output voltage.

* * * * *